United States Patent [19]

Yalpani

[11] Patent Number: 4,531,000
[45] Date of Patent: Jul. 23, 1985

[54] PROCESSES FOR THE PREPARATION OF BRANCHED, WATER SOLUBLE CELLULOSE PRODUCTS

[75] Inventor: Manssur Yalpani, Vancouver, Canada

[73] Assignee: British Columbia Research Council, Vancouver, Canada

[21] Appl. No.: 658,036

[22] Filed: Oct. 5, 1984

[51] Int. Cl.$^3$ .................................................. C08B 11/193
[52] U.S. Cl. ........................................ 536/30; 536/14; 536/15; 536/43; 536/55.2; 536/44
[58] Field of Search ................. 536/14, 15, 30, 43, 536/55.2, 44

[56] References Cited

U.S. PATENT DOCUMENTS

| | | | |
|---|---|---|---|
| 2,463,885 | 3/1949 | Kuehl et al. | 536/55.2 |
| 3,029,232 | 4/1962 | Bikales et al. | 536/43 |
| 3,567,360 | 3/1971 | Pierce et al. | 536/43 |
| 3,726,859 | 4/1973 | Engelskirchen et al. | 536/43 |
| 3,743,634 | 7/1973 | Woo | 536/14 |
| 3,956,275 | 5/1976 | Demain et al. | 536/14 |

FOREIGN PATENT DOCUMENTS 42-26294 12/1967 Japan ................................ 536/55.2

Primary Examiner—Ronald W. Griffin
Attorney, Agent, or Firm—Christie, Parker & Hale

[57] ABSTRACT

A process for preparing n-amino-n-deoxy cellulose where n is 2 or 3 and has the same value at each occurrence in one molecule. When n is 2 cellulose is selectively oxidized by (a) reacting it with triphenylmethyl chloride; then (b) reacting the product from (a) with acetic anhydride and dimethylsulfoxide. The product from (b) is then subjected to reductive amination. When n is 3 cellulose is reacted with dimethylsulfoxide and paraformaldehyde. The product from (a) is then reacted with acetic anhydride and dimethylsulfoxide and the product from (b) then subjected to reductive amination.

29 Claims, No Drawings

PROCESSES FOR THE PREPARATION OF BRANCHED, WATER SOLUBLE CELLULOSE PRODUCTS

FIELD OF THE INVENTION

This invention relates to a process for the preparation of certain cellulose derivatives.

DESCRIPTION OF THE PRIOR ART

The conversion of insoluble cellulose or cellulose-containing materials into derivatives soluble in either aqueous or non-aqueous media has been of prime interest to industry for many years. Several methods are available for the preparation of water soluble cellulose derivates, including various alkyl ether derivatives, such as methyl cellulose, ethyl cellulose, carboxymethyl cellulose, hydroxyethyl cellulose, hydroxypropyl cellulose, etc., as exemplified by U.S. Pat. Nos. 2,278,612; 2,517,577; 2,140,568; 2,009,015; 2,160,782; 3,064,313; 3,280,026; 3,498,971; 3,567,360; and 3,574,188.

Water soluble cellulose products have applications in numerous areas, including foods, textiles, paints, cosmetics and pharmaceuticals. The utility of these products in many of these applications relies on their ability to confer high viscosities to aqueous media. However, it has been shown that the viscosifying properties of these cellulose alkyl ether derivatives are inadequate for certain applications, such as in mobility control applications in enhanced oil recovery. These shortcomings derive, among other things, from the methods employed in the manufacturing processes. In order to obtain water soluble products, relatively high degrees of substitution are required. As a consequence, these processes often rely on strongly alkaline or otherwise extreme reaction conditions to achieve adequate activation of the intractable cellulose for subsequent chemical derivatizations. These conditions commonly lead to partial or substantial degradation of the resulting products. Various attempts have been made to overcome these problems by employing alternative methods of derivatization, such as graft copolymerization (U.S. Pat. Nos. 3,359,224; 3,366,582; 3,838,077; etc.). Turunen et al in PCT Intern. Appl. No. WO 83 02,278, 1983 have described a method for solubilizing cellulose by a process which involves x-ray irradiation, impregnation with ammonia and urea, evaporation of the ammonia, and finally heating of the mixture to obtain an alkali-soluble cellulose carbamate derivative. However, these methods have met with only limited success for certain applications.

In general, the method employed in the preparation of such alkylether derivatives of cellulose can be classified as non-selective, in that the reagents used (e.g. haloalkyl acids, alkylene oxides, etc.) exhibit essentially no differential reactivity towards cellulose hydroxyl groups at different positions of the anhydroglucose repeat unit, resulting in a random distribution of substituents.

It is therefore desirable to have available derivatization methods, which are selective for only one of the hydroxyl functions, yet sufficiently simple and efficient to be applicable to industrial scale use. Selective modifications are advantageous in that they permit a greater control over the physical properties of the product and avoid some of the side reactions which are commonly associated with non-selective methods, such as formation of polymeric side chains. Substantial efforts have, for example, been directed at developing methods for the selective oxidation of primary and secondary hydroxyl groups. The introduction of carbonyl groups into polysaccharides constitutes one of the most important synthetic tasks, because it affords reactive intermediates which are amenable to further modifications, such as reductive amination, epimerization via reduction, and conversion into branched derivatives. Selective oxidations are furthermore of interest in the evaluation of the stability of oxidized polysaccharides in various industrial processes, such as in the bleaching and aging of cellulose-containing materials.

There is, at present, no generally applicable method available for selectively converting the C-6 hydroxyl functions of polysaccharides to the corresponding aldehydes or carboxylic acids. Most oxidation procedures result in the formation of mixtures of aldehyde and acid residues and degradation products. Considerable efforts have, for example, been directed at the oxidation of cellulose using nitrogen dioxide either in the gas phase or dissolved in carbon tetrachloride. It has been shown that the predominant reaction is the conversion of D-glucose to D-glucuronic acid residues. However, this is accompanied by some oxidation of secondary hydroxyl functions. Quantitative oxidations at C-6 can furthermore not be accomplished without concomitant depolymerization.

K. Brederick, Tetrahydron Lett. 695, 1967, observed that oxidation of cellulose with dimethyl sulphoxide (DMSO)/acetic anhydride ($Ac_2O$) yielded mixtures of 2-oxy, 3-oxy, and 2,3-oxy cellulose products. This method was then used by C. Bosso, J. Defaye, A. Gadelle, C. C. Wong and C. Pederson, J. Chem. Soc., Perkin Trans., 1, 1579, 1982 for the selective oxidation of 6-0-trityl cellulose to afford the corresponding 2-oxy-cellulose derivative. Further developments were achieved by the same group following the discovery of the DMSO/paraformaldehyde solvent system for cellulose. They found that 3-oxy-cellulose could be obtained in yields of 60-70% without prior C-6 protection of the native polymer, using the DMSO/$Ac_2O$ oxidation system in combination with the DMSO/paraformaldehyde (PF) solvent. Detailed studies of the oxidation products showed that formaldehyde substitution occurs initially at the C-6 and C-2 positions of amylose and with increasing concentration also at C-3. While oxidation of unprotected cellulose with DMSO/$Ac_2O$/PF proceeds exclusively at position C-3, it was found that in the case of amylose some 10% oxidation at C-2 had also occurred at similar overall levels of oxidations (degree of oxidation, d.o., 0.6-0.7). For 6-0-trityl cellulose, they found a greater proportion of 2-oxy (56%) than 3-oxy (36%) products. On the other hand, oxidation occurred exclusively at C-2 for 6-0-tritylamylose, but 56% at C-2 and 30% at C-3 in the case of 6-0-acetyl amylose (d.o. 0.7). These data indicate that the selectivity of C-2 oxidation is not related to the bulkiness of the C-6 substituent. It can be concluded from the work of Defaye et al that the selective oxidation of C-3 positions of unprotected amylose and cellulose is due to the reversible covalent formation of hydroxymethyl and poly(oxymethylene)ol groups at positions C-2 and C-6. Selectively oxidized cellulose derivatives are important precursors for the preparation of amino-deoxy-cellulose derivatives, which are of interest for a variety of applications, including flocculating and metal chelating agents, in enzyme immobilization, etc., as evidenced by U.S.S.R.

Pat. No. 473,724 (1975, B. N. Gobunov, P. A. Protopopov, A. P. Khardin). N. Polukhina, L. S. Gal'braikh, and Z. A. Rogovin, Vysokomolekul, Soedin, B11, 270, 1969 and N. Kholmuradov, Yu, S. Kozlova, L. S. Gal'braikh, and Z. A. Rogorin, Vysokomolekul, Soedin, 8, 1089, 1966, have reacted 2,3-anhydro derivatives of cellulose with ammonia to obtain mixed polysaccharide products with 2-amino-2-deoxy-and 3-amino-3-deoxy-substituents. A total of four types of aminosugars were identified in these products, of which two were 3-amino-3-deoxy altrose and 2-amino-2-deoxy glucose.

T. Teshirogi, H. Yamamoto, M. Sakamoto and H. Tonami, Sen-I Gakkaishi, 36, T502, 1980 have recently reported a method for preparing 2-amino-2-deoxy-cellulose having a degree of substitution (d.s.) of 0.37. Their method is based on selective oxidation of 6-0-triphenylmethyl cellulose to 2-oxo-6-0-triphenylmethyl-cellulose, conversion into the oxime by hydroxylamine hydrochloride, reduction with lithium aluminum hydride, and finally detritylation with acid. However, this method has a number of disadvantages, in that (i) the overall chemical yields are low, (ii) it involves five chemical steps, of which two are connected with the introduction of stable amine functions and another two steps involve acid treatment of the polymer; (iii) reduction of the oxime intermediate leads to side reactions, such as loss of amine functions due to some formation of keto functions, and polymer degradation arising from the destruction of excess reducing agent; and (iv) the applicability of the method has been demonstrated for only one type of cellulose starting material.

M. Yalpani, L. D. Hall, J. Defaye and A. Gadelle, Can. J. Chem., 62, 260, 1984, have recently reported the preparation of 3-amino-3-deoxy-cellulose with d.s. 0.3 using regenerated cellulose as starting material. In both of these methods, the yields of aminodeoxy-cellulose were unsatisfactory, and only the more chemically reactive cellulose starting materials were employed.

SUMMARY OF THE INVENTION

This invention therefore seeks (a) to develop procedures for the preparation of new types of water soluble cellulose derivatives by selective attachment of carbohydrate residues; (b) to use mild reaction conditions in order to retain the molecular integrity of the final products; (c) to develop procedures which can utilize low cost raw materials, such as wood pulp, for the preparation of these water soluble products; and (d) to develop procedures which allow the preparation of cellulose products with high degrees of substitution, and with the potential for a wide range of structural variations of parameters such as the length, type, and conformation of the branch residue, as well as their net charge.

Accordingly, the invention provides a process for preparing n-amino-n-deoxy cellulose where n is 2 or 3 and has the same value at each occurrence in one molecule, the process comprising (i) when n is 2 selectively oxidizing cellulose by (a) reacting it with triphenylmethyl chloride; then (b) reacting the product from (a) with acetic anhydride and dimethylsulfoxide, then (c) subjecting the product from (b) to reductive amination; (ii) when n is 3 (a) reacting cellulose with dimethylsulfoxide and paraformaldehyde then (b) reacting the product from (a) with acetic anhydride and dimethylsulfoxide and then (c) subjecting the product from (b) to reductive amination.

In one aspect the invention provides a process for producing a branched water soluble cellulose derivative having at least part of the carbon atoms at position 2 or at position 3 substituted by an amino carbohydrate group, the process comprising subjecting 2-oxy cellulose or 3-oxy cellulose to reductive amination using an amino sugar and a reducing agent able to reduce the imine group in the presence of carbonyl groups.

In another aspect the invention provides a process for producing a branched water soluble cellulose derivative having at least part of a carbon atoms at position 2 or position 3 substituted by an amino carbohydrate group, the process comprising converting a 2-amino-2-deoxy or 3-amino-3-deoxy cellulose to the branched product by reductive alkylation with an aldehyde or carbonyl containing carbohydrate and a reducing agent able to reduce the imine group in the presence of carbonyl.

According to the invention selective oxidations of cellulose hydroxyl functions at either C-2 or C-3 are accomplished using acetic anhydride and dimethyl sulfoxide as the oxidant and either 6-0-triphenyl methyl cellulose or unprotected cellulose, respectively. In the latter case, the cellulose starting material can be derived from a variety of sources and pretreatments, for example, regenerated cellulose or cellulose obtained from wood pulp. For the preparation of 6-0-triphenyl-methyl cellulose regerenated cellulose is preferred. For the preparation of C-2 or C-3 aminated cellulose derivatives from the corresponding oxy-cellulose derivatives, any ammonium salt or primary or secondary amine-containing reagent can be employed. Ammonium acetate, ammonium chloride, hydrazine, or ethylenediamine are preferred. Any reducing agent which reduces imines in the presence of carbonyl functions can be used. Sodium cyanoborohydride is preferred.

Any aqueous or polar organic solvent or mixtures thereof can be employed, with water (at neutral pH) or aqueous alcohol, ethyl alcohol, methyl sulphoxide or dimethyl formamide being preferred. The reaction temperatures can vary between 20°–90° C., but should preferably not exceed 60° C. Similarly, the conversion of the oxycellulose or aminocellulose derivatives into branched derivatives can be performed using reductive amination and reductive alkylation, respectively. In the former case, any amino sugar, such as glucosamine, galactosamine, maltosamine, streptomycin, etc., or products obtained by amination of carbohydrates may be employed.

For the reductive alkylation of amino cellulose derivatives any aldose or ketose, or other carbonyl-containing saccharide may be employed, with aldoses and ketoses being preferred.

DESCRIPTION OF PREFERRED EMBODIMENTS

The following examples illustrate the invention:

EXAMPLE 1

2-Amino-2-Deoxy-Cellulose

Alpha cellulose fibres (15.0 g, approximately 99.5% pure) were converted to the 6-0-triphenylmethyl cellulose derivative using triphenylmethyl chloride (61.0 g) according to known methods (J.W. Green, Methods in Carbohydrate Chemistry, Vol. III, R.L. Whistler, ed., Academic Press, 1963, p. 327), following a pretreatment with pyridine for 18 h. Samples (2.0 g) of the 6-0-triphenylmethyl cellulose derivative dissolved in dimethyl sulphoxide (100 mL) were treated with acetic anhydride (20 mL) and the mixture was stirred for 90 h. The 2-oxy-cellulose product was filtered, washed with water (1 L) and methanol (0.6 L), and dried (1.8 g). A portion of this material (1.0 g) was subsequently treated with ammonium acetate (3.0 g) and sodium cyanoborohydride (2.2 g) in water at room temperature for 45 h. The 2-amino-2-deoxy-6-0-triphenylmethyl cellulose products thus obtained after exhaustive washing with water (1 L) and methanol (0.2 L) and drying, had nitrogen contents varying between 0.81–1.11%, corresponding to degrees of substitution of 0.2–0.3. Treatment of this product with dilute (1 M) hydrochloric acid in acetone resulted in the removal of the 6-0-protecting function.

EXAMPLE 2

2-Amino-2-Deoxy-Cellulose

A sample of α-cellulose fibres (5.0 g) was dispersed in (50%) aqueous pyridine at 95° C. for 18 h, filtered, resuspended dry pyridine at 95° C. for 3 h, filtered and resuspended in dry pyridine at 95° C. for 18 h, filtered, washed with N,N-dimethyl formamide (DMF, 100 mL) and then resuspended in DMF. This suspension was treated with N,N-dimethylaminopyridine (0.58 g, 3 mmol), triphenylmethylchloride (18.85 g, 68 mmol), and triethylamine (15 mL) at 30° C. for 24 h. The product was filtered, washed with methanol (1 L), and dried. This material was oxidized, and subsequently reductively aminated, using ammonium acetate, as described in Example 1. The resulting 2-amino-2-deoxy-6-0-triphenylmethyl cellulose derivatives had nitrogen contents of 0.70–0.77%.

EXAMPLE 3

3-Amino-3-Deoxy-Cellulose

A sample (50.0 g) of a 2% aqueous suspension of microfibrillated cellulose was suspended in methyl sulphoxide (DMSO, 100 mL) at 100° C. for 2 h, filtered, and resuspended in DMSO (150 mL) for 10 h, heated to 90° C., filtered and resuspended in DMSO (150 mL). This material was then treated with acetic anhydride (15 mL) at 80° C. for 48 h. The brown suspension was filtered, washed with water, resuspended in water (50 mL) and treated with ammonium acetate (1.5 g) and sodium cyanoborohydride (2.2 g) at room temperature for 45 h. The product, 2-amino-2-deoxy-cellulose, was isolated after filtration and washing, and had N contents of 0.45–1.50%.

EXAMPLE 4

3-Amino-3-Deoxy-Cellulose

A suspension of Acetakraft pulp (11.1 g) in DMSO (900 mL) was treated with paraformaldehyde (24.0 g) at 90° C. for 3 h with stirring. Another portion (11.0 g) of paraformaldehyde was added and the temperature raised to 125° C. for 1 h, and then to 135° C. for 1 h, resulting in almost complete dissolution of the cellulose material. The slightly turbid suspension was cooled, and then treated with acetic anyhydride (80 mL) in the dark for 20 h. Water was added to the resulting oxidized material, and the suspension was filtered, washed with water (1 L), methanol (0.6 L), and diethyl ether (0.4 L), yielding a white, fluffy material (10.5 g). Samples (1.0 g) of this material were treated with NH$_4$OAc (3.6 g) and NaCNBH$_3$ (2.2 g) in DMSO (100 mL) at room temperature for 7 days. The resulting brown solutions were dialyzed for 4 days yielding white gels, which were lyophilized. The 3-amino-3-deoxy-cellulose products thus obtained had N-contents of 1.07–1.09%.

EXAMPLE 5

3-Amino-3-Deoxy-Cellulose

A sample (1.5 g) of 3-oxy-cellulose derived from Acetakraft as described in Example 4, was treated with paraformaldehyde (8.9 g) in DMSO (100 mL) at 100° C. for 2 h, cooled and then reoxidized with acetic anhydride for 18 h at room temperature. The product was isolated and reductively aminated as described in Example 4, yielding, after purification by dialysis, a 3-amino-3-deoxy-cellulose product with a N-content of 4.77%.

EXAMPLE 6

3-Amino-3-Deoxy-Cellulose

A sample of regenerated cellulose (5.0 g) in DMSO (200 mL) was treated with paraformaldehyde (10.2 g) at 90° C. for 3 h, then at 125° C. for 1 h, and finally at 135° C. for 1 h. The resulting clear solution was cooled to room temperature, and treated with acetic anhydride for 20 h in the dark. The oxycellulose product was precipitated with water, filtered, washed with water (0.4 L), methanol (0.2 L), and ether (0.2 L) yielding a light yellow powder (4.8 g). Samples (1.0 g) of this material were reductively aminated as described in Example 4 yielding, after dialysis, 3-amino-3-deoxy-cellulose derivatives with N-contents of up to 6.38%, corresponding to a d.s. of ca. 0.9.

EXAMPLE 7

3-Amino-3-Deoxy-Cellulose

A sample of regenerated cellulose (2.2 g) in DMSO (100 mL) was treated with paraformaldehyde (6.1 g) at 110° C. for 1 h. The reaction mixture was cooled to room temperature and treated with acetic anhydride (35 mL) in the dark for 18 h. The resulting white suspension was treated with methanol (100 mL), filtered, washed with methanol (0.4 L), and dried. Reductive amination of this material with NH$_4$OAc (3.5 g) and NaCNBH$_3$ (2.0 g) at room temperature for 3 days gave 3-amino-3-deoxy-cellulose with N contents of 2.34–2.8%.

EXAMPLE 8

3-Amino-3-Deoxy-Cellulose

Samples of α-cellulose fibres (5.0 g) were solvent pretreated for several hours with either dimethyl sulphoxide, methanol, or acetic acid at either room temperature or up to 70° C. and then oxidized and reductively aminated as described in Example 4. The resulting 3-amino-3-deoxy-cellulose products had N-contents between 0.80–1.05%.

EXAMPLE 9

3-N-(2-Amino-2-Deoxy-glucose)-3-Deoxy-Cellulose

A sample of 3-oxy-cellulose (1.5 g), derived from Acetakraft as described in Example 4, in DMSO (100 mL) was treated with a DMSO solution containing glucosamine hydrochloride, (3.6 g), and NaCNBH$_3$ (2.0 g) at room temperature for 7 days. The water soluble product (1.3 g) was obtained after dialysis and precipitation, and had a N-content of 4.12%.

EXAMPLE 10

3-N-(2-Amino-2-Deoxy-glucose)-3-Deoxy-Cellulose

A sample of 3-amino-3-deoxy-cellulose (1.0 g) with N-content of 2.8% obtained from Example 7, was treated with D-glucose (1.4 g), and NaCNBH$_3$ (1.8 g) in DMSO (100 mL) at room temperature for 4 days, yielding, after dialysis, a water soluble product with N-content of 1.50%.

EXAMPLE 11

2-N-(2-Amino-2-Deoxyglucose)-2-Deoxy-Cellulose

A solution of 2-oxy-6-0-triphenylmethylcellulose (1.0 g, 2.56 mmol), obtained from Example 2, in DMSO (25 mL) was treated with a DMSO solution of glucosamine hydrochloride (1.3 g, 6 mmol) and NaCNBH$_3$ (0.8 g, 13 mmol) containing solid Na$_2$CO$_3$ (0.74 g, 7 mmol) at room temperature for 30 h.

After removal of the solids, the product was precipitated with iso-propanol, treated first with methanolic-hydrochloric acid (pH 5), and then with methanol (until neutral), and dried to yield 0.7 g of the water soluble branched cellulose derivative with N content of 6.32%.

The reductive amination could alternatively be conducted in aqueous solution resulting in products with N-contents of up to 1.62%.

EXAMPLE 12

3-N-(2-Amino-2-Deoxy-glucose)-3-Deoxy-Cellulose

A sample of 3-oxycellulose (2.8 g) in DMSO (150 mL) obtained from Example 8 was treated with a DMSO solution containing glucosamine hydrochloride, (6.7 g 31 mmol), NaCNBH$_3$ (2.2 g, 35 mmol) and pyridine (2 mL, 25 mmol). The reaction mixture was warmed to 50° C. and stirred for 24 h. The resulting orange solution was precipitated with iso-propanol (0.5 L); the precipitate was filtered, washed with iso-propanol (0.4 L), and dried in vacuo at 45° C. The yellow product had a N-content of 1.30%.

EXAMPLE 13

3-N-(1-Amino-1-Deoxy-Lactit-1-yl)-3-Deoxy-Cellulose

A sample of 3-amino-3-deoxy-cellulose (1.5 g, 0.9 mmol) obtained from Example 6, with a N-content of 2.17%, dispersed in water (125 mL) was treated with β-lactose (4.6 g, 13.4 mmol) and NaCNBH$_3$ (1.0 g, 16 mmol) at room temperature for 50 h. The resulting water soluble product (3.4 g) had a N-content of 1.51%.

The process of the invention, for the preparation of the 2- and 3-aminocellulose as well as the branched 2- and 3-deoxycellulose derivatives, are efficient and inexpensive. The selectively modified products thus obtained are of use for a variety of applications either by themselves or as chemical intermediates for new types of cellulose products. The reaction conditions are mild and avoid polymer degradation which is common with many other chemical methods. The derived products are of greater utility as they retain more of the macro-molecular properties of the native cellulose.

The process allows for a considerable degree of structural variation for the branched derivatives, with parameters such as branch length, conformation and type being readily modified. Similarly, the branched products can be designed to be neutral, or to carry anionic or cationic charge by simple choice of the carbohydrate residue to be attached as side chain, or by facile chemical modifications such as oxidation, etc.

It should also be noted the use of N,N-dimethylamine-pyridine as catalyst (see Example 2) provides improved yields of the triphenylmethyl derivative. Further if the reaction with DMSO and acetic anhydride is carried out with exclusion of light and at relatively high temperatures (as exemplified) then substantially higher oxidation levels (about 30 to 40%) are achieved without side reactions such as discoloration. Note also the invention permits the use of wood pulp as starting material, which is widely available and inexpensive.

Aminocellulose derivatives are useful as cationic polymers for applications as flocculating agents, inexpensive metal-chelating derivatives, and for certain bio-medical applications.

The branched cellulose derivatives constitute new types of water soluble derivatives which will find a wide range of uses in all the areas where water soluble polymers are presently employed, e.g. as thickening and suspending agents, etc.

I claim:

1. A process for preparing n-amino-n-deoxy cellulose where n is 2 or 3 and has the same value at each occurrence in one molecule, the process comprising:
   (i) when n is 2 selectively oxidizing cellulose by (a) reacting it with triphenylmethyl chloride; then (b) reacting the product from (a) with acetic anhydride and dimethylsulfoxide, then (c) subjecting the product from (b) to reductive amination;
   (ii) when n is 3 (a) reacting cellulose with dimethylsulfoxide and paraformaldehyde then (b) reacting the product from (a) with acetic anhydride and dimethylsulfoxide and then (c) subjecting the product from (b) to reductive amination.

2. A process as claimed in claim 1 in which the reductive amination uses a reagent including a reducing agent able to reduce an imine in the presence of the carbonyl group.

3. A process as claimed in claim 2 in which the reducing agent is sodium cyanoborohydride.

4. A process as claimed in claim 2 in which the reductive amination is carried out using an amino sugar.

5. A process as claimed in claim 4 in which the amino sugar is selected from glucosamine, galactosamine, maltosamine and streptomycin.

6. A process as claimed in claim 2 in which the reductive amination is carried out with a compound selected from an ammonium salt, a compound containing a primary amino group and a compound containing a secondary amino group.

7. A process as claimed in claim 6 in which the compound is selected from ammonium acetate, ammonium chloride, hydrazine and ethylenediamine.

8. A process as claimed in claim 2 including a further step of reductive alkylation using an aldehyde or carbonyl containing reagent.

9. A process as claimed in claim 8 in which reductive alkylation is carried out using an aldehyde- or carbonyl-containing carbohydrate and sodium cyanoborohydride.

10. A process as claimed in claim 9 in which the carbohydrate is an aldose or a ketose.

11. A process as claimed in claim 1 in which, when n is 2, the cellulose is regenerated cellulose.

12. A process as claimed in claim 1 in which, when n is 3, cellulose is regenerated cellulose or cellulose obtained from wood pulp.

13. A process as claimed in claim 1 in which the reaction is carried out in a solvent selected from water, aqueous alcohol, ethanol, methyl sulfoxide and dimethyl formamide.

14. A process as claimed in claim 1 in which, in process i), N,N-dimethylpyridine is used to catalyse the reaction between cellulose and triphenylmethyl chloride.

15. A process as claimed in claim 1 in which the reaction is carried out at elevated temperature and with the exclusion of light.

16. A process for producing a branched water soluble cellulose derivative having at least part of the carbon atoms at position 2 or at position 3 substituted by an amino carbohydrate group, the process comprising subjecting 2-oxy-cellulose or 3-oxy-cellulose to reductive amination using an amino sugar and a reducing agent able to reduce the imine group in the presence of carbonyl.

17. A process as claimed in claim 16 in which the reducing sugar is selected from glucosamine, galactosamine, maltosamine and streptomycin.

18. A process as claimed in claim 16 in which the reducing agent is sodium cyanoborohydride.

19. A process for producing a branched water soluble cellulose derivative having at least part of a carbon atom at position 2 or position 3 substituted by an amino carbohydrate group, the process comprising converting a 2-amino-2-deoxy or 3-amino-3-deoxy-cellulose to the branched product by reductive alkylation with an aldehyde or carbonyl containing carbohydrate and a reducing agent able to reduce the imine group in the presence of carbonyl.

20. A process as claimed in claim 19 in which the reducing agent is sodium cyanoborohydride.

21. A process as claimed in claim 16 for producing 3-N-(2-amino-2-deoxy-glucose)-3-deoxy-cellulose that comprises reacting 3-oxy-cellulose with glucosamine hydrochloride and sodium cyanoborohydride.

22. A process as claimed in claim 19 for producing 3-N-(2-amino-2-deoxy-glucose)-3-deoxy-cellulose that comprises reacting 3-amino-3-deoxy-cellulose with D-glucose and sodium cyanoborohydride.

23. A process as claimed in claim 16 for preparing 2-N-(2-amino-2-deoxyglucose)-2-deoxy-cellulose that comprises reacting 2-oxy-6-0-triphenylmethyl-cellulose with glucosamine hydrochloride and sodium cyanoborohydride.

24. A process as claimed in claim 16 for preparing 2-N-(2-amino-2-deoxy-glucose)-3-deoxy-cellulose that comprises reacting 3-oxycellulose with glucosamine and sodium cyanoborohydride.

25. A process as claimed in claim 19 for preparing 3-N-(1-amino-1-deoxy-Lactit-1-yl)-3-deoxy-cellulose that comprises reacting 3-amino-3-deoxy-cellulose with β-lactose and sodium cyanoborohydride.

26. A cellulose derivative of the formula:

cellulose—NH CH$_2$ R where the group—NH CH$_2$ R is covalently linked to the 2 or 3 position of the cellulose and R is selected from a mono-, di- or oligosaccharide residue.

27. A cellulose derivative as claimed in claim 26 in which R is an aldose or ketose attached via the aldehyde or keto carbon atom.

28. A cellulose derivative as claimed in claim 27 in which R is an aldose or ketose residue attached via the carboxyl carbon atom.

29. A cellulose derivative as claimed in claim 27 in which R is a residue of glucose, galactose, arabinose, xylose, glucosamine, galactosamine, mannose, mannosamine, lactose, cellobiose, maltose and melibiose.

* * * * *